US009729505B2

(12) United States Patent
Rajagopalan et al.

(10) Patent No.: US 9,729,505 B2
(45) Date of Patent: Aug. 8, 2017

(54) SECURITY THREAT ANALYSIS

(71) Applicant: Hewlett-Packard Development Company, L.P., Houston, TX (US)

(72) Inventors: Siva Raj Rajagopalan, Chandler, AZ (US); Tomas Sander, New York, NY (US); Suranjan Pramanik, Fremont, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 517 days.

(21) Appl. No.: 13/755,195

(22) Filed: Jan. 31, 2013

(65) Prior Publication Data

US 2014/0215608 A1    Jul. 31, 2014

(51) Int. Cl.
*H04L 9/00*    (2006.01)
*H04L 29/06*    (2006.01)
*G06Q 10/00*    (2012.01)

(52) U.S. Cl.
CPC ............. *H04L 63/00* (2013.01); *G06Q 10/00* (2013.01); *H04L 63/14* (2013.01)

(58) Field of Classification Search
CPC .......... H04L 63/00; H04L 63/14; G06F 10/00
USPC ..................................................... 726/22–24
See application file for complete search history.

(56) References Cited

U.S. PATENT DOCUMENTS

| 6,807,569 | B1 | 10/2004 | Bhimani et al. |
| 7,461,036 | B2 | 12/2008 | Genty et al. |
| 7,594,224 | B2 | 9/2009 | Patrick et al. |
| 7,779,119 | B2 | 8/2010 | Ginter et al. |
| 7,784,097 | B1 | 8/2010 | Stolfo et al. |
| 7,841,008 | B1 | 11/2010 | Cole et al. |
| 7,953,846 | B1 | 5/2011 | Amoroso et al. |
| 7,996,888 | B2 | 8/2011 | Asunmaa et al. |
| 8,056,130 | B1 * | 11/2011 | Njemanze et al. ............. 726/22 |
| 8,065,725 | B2 * | 11/2011 | Zheng et al. ................... 726/22 |
| 8,204,813 | B2 | 6/2012 | Merkoulovitch et al. |
| 8,286,239 | B1 | 10/2012 | Sutton |
| 8,327,442 | B2 | 12/2012 | Herz et al. |
| 2005/0102534 | A1 | 5/2005 | Wong |
| 2007/0169171 | A1 | 7/2007 | Kumar et al. |
| 2008/0172382 | A1 | 7/2008 | Prettejohn |
| 2010/0299292 | A1 | 11/2010 | Collazo |
| 2011/0153383 | A1 | 6/2011 | Bhattacharjya et al. |
| 2011/0161069 | A1 | 6/2011 | Staffel |
| 2011/0173699 | A1 | 7/2011 | Figlin et al. |
| 2011/0239270 | A1 | 9/2011 | Sovio et al. |

(Continued)

OTHER PUBLICATIONS

Evans, et al., "Context-derived Pseudonyms for Protection of Privacy in Transport Middleware and Applications", Proceedings of the Fifth IEEE International Conference on Pervasive Computing and Communications Workshops (PERCOMW'07), Mar. 2007, 6 pages.

(Continued)

*Primary Examiner* — Beemnet Dada

(57) ABSTRACT

An example of security threat analysis can include generating a security threat hypothesis based on security data in a threat exchange server. A request for analysis based on the security data can be sent via communication links to at least one security monitored participant to analyze the security data. A response can be received from the at least one security monitored participant with information related to the completed security related task.

21 Claims, 3 Drawing Sheets

(56) References Cited

U.S. PATENT DOCUMENTS

| | | |
|---|---|---|
| 2011/0302653 A1 | 12/2011 | Lloyd et al. |
| 2012/0072983 A1 | 3/2012 | McCusker et al. |
| 2012/0233698 A1 | 9/2012 | Watters et al. |
| 2012/0246730 A1 | 9/2012 | Raad et al. |
| 2014/0122163 A1* | 5/2014 | Simpson et al. .............. 705/7.28 |

OTHER PUBLICATIONS

Fiat, et al., "Broadcast Encryption", Advances in Cryptology (CRYPTO'93), Lecture Notes in Computer Science, vol. 773, Jul. 1994, 13 pages.
Neubauer., "An Evaluation of Technologies for the Pseudonymization of Medical Data", In Computer and Information Science, SCI 208, Apr. 2009, pp. 47-60.
Sweeney, Latanya., "Uniqueness of simple demographics in the U.S. population", (Shorter Version: "Simple Demographics Often Identify People Uniquely") LIDAPWP4, Carnegie Mellon University, Laboratory for International Data Privacy, Pittsburgh, PA, May 2000, 34 pages.
Ando, et al., "Parallel analysis for lightweight network incident detection using nonlinear adaptive systems", Proceedings of IFIP International Conference on Network and Parallel Computing, Sep. 18-21, 2007, 7 pages.
Jain, et al., "Data Clustering: A Review", ACM Computing Surveys, vol. 31, No. 3, Sep. 1999, pp. 264-323.
Julisch, K., "Mining Alarm Clusters to Improve Alarm Handling Efficiency", Proceedings of the 17th Annual Computer Security Applications Conference (ACSAC01), Dec. 10-14, 2001, 10 pages.
Lee, W., "A Data Mining Framework for Constructing Features and Models for Intrusion Detection Systems", PhD Thesis, Columbia University, 1999, 193 pages.
Katti, et al., "Collaborating Against Common Enemies", ACM Internet Measurement Conference, Aug. 2005, 23 pages.
Punj, et al., "Cluster Analysis in Marketing Research: Review and Suggestions for Application", Journal of Marketing Research, vol. 20, No. 2, May 1983, pp. 134-148.
Porras, et al., "A Mission-Impact-Based Approach to INFOSEC Alarm Correlation", Proc. Int'l Symp. The Recent Advances in Intrusion Detection, Oct. 2002, 19 pages.
Vaarandi, Risto., "A data clustering algorithm for mining patterns from event logs", 3rd IEEE Workshop on IP Operations and Management, 2003, (IPOM 2003), Oct. 1-3, 2003, 8 pages.
Wedel, et al., "Market Segmentation: Conceptual and Methodological Foundations", Journal of Targeting Measurement and Analysis for Marketing, Aug. 2000, Kluwer Academic Publishers, vol. 9, Issue: 1, 2 pages.
Boggs, et al., "Cross-domain Collaborative Anomaly Detection: So Far Yet So Close", 12th International Symposium on Recent Advances in Intrusion Detection, RAID 2009, Saint-Malo, Brittany, France, Sep. 23-25, 2009, 20 pages.
Zhang, et al., "Highly Predictive Blacklisting", 17th USENIX Security Symposium, San Jose, CA, USA, Jul. 28-Aug. 1, 2008, pp. 107-122.
Sundaramurthy, et al., "Examining Intrusion Prevention System Events from Worldwide Networks", 19th ACM Pre-Conference on Building Analysis Datasets and Gathering Experience Returns for Security (BADGERS'12), Raleigh, NC, USA, Oct. 15, 2012, 8 pages.
Abdulrahman, "Investigating the Technological and Practical Levels of Maturity of the Industry to Implement Web Services Security", Master's Thesis for: Department of Numerical Analysis and Computer Science, Stockholm Royal Institute of Technology, Oct. 2005, 92 pages.
Ben-Shalom, et al., "Granular Trust Model Improves Enterprise Security", www.intel.com/IT, Intel Corporation, Nov. 2012, 8 pages.
Zhou, et al., "Modeling Network Intrusion Detection Alerts for Correlation", ACM Transactions on Information and System Security, vol. 10, No. 1, Article 4, Feb. 2007, 31 pages.
Unknown.; "Monitoring, Analysis, and Correlation" Accessed via: http http://www.cisco.com/en/US/docs/solutions/Enterprise/Security/SAFE_RG/chap10.html, Dec. 2012, 26 pages.
Unknown., "Real-Time Threat Management—Securing Your Journey to the Cloud", Trend Micro, Jun. 2011, 2 pages.
Kaplan, Dan., "Sharing the pie: Threat Collaboration", Accessed via: http://www.scmagazine.com/sharing-the-pie-threat-collaboration/article/250421/, SC Magazine, Aug. 1, 2012, 3 pages.
Unknown., "AlienVault Open Threat Exchange" Dec. 2012, 2 pages.
Phillips, et al., "Information Sharing and Security in Dynamic Coalitions," Jun. 2002, 16 pages.
Fokoue, et al., "A Decision Support System for Secure Information Sharing," The 14th ACM Symposium on Access Control Models and Technologies SACMAT'09, Jun. 3-5, 2009, Stresa, Italy, 10 pages.

* cited by examiner

SECURITY THREAT ANALYSIS

BACKGROUND

Governments and private sector industries may use the internet as a network for exchange of information. Due to the open nature of the network, entities on the network may be susceptible to security attacks. These entities may experience organized attacks on their information technology (IT) infrastructure. A security attack may include an attempt to destroy, disable, steal, and/or gain unauthorized access to use of an asset (e.g., a resource, data, information, etc.).

DETAILED DESCRIPTION

Figure 1:
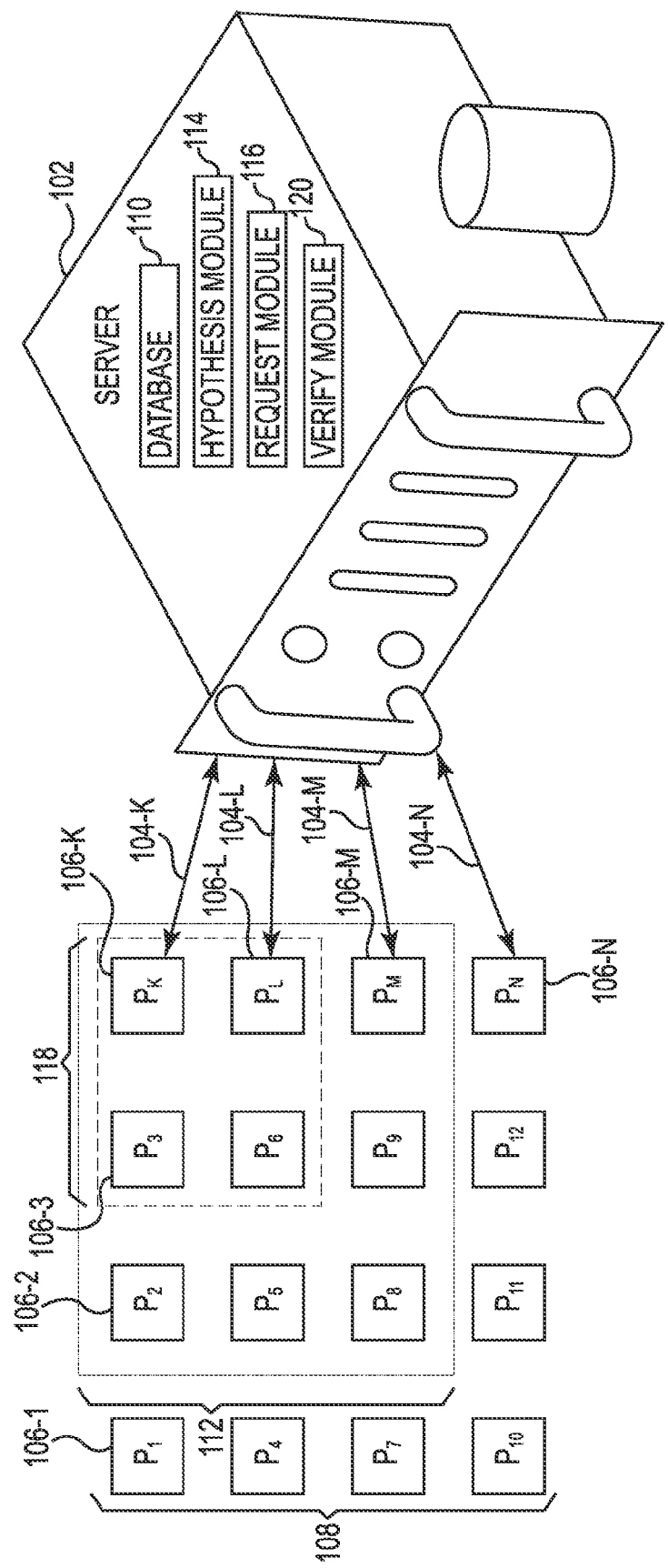
FIG. 1 illustrates an example of a system for security threat analysis according to the present disclosure.

Entities can seek to avoid security attacks by identifying a security threat to their network. A security threat can include an identified potential security attack (e.g., a circumstance and/or event with the potential to adversely impact a network through unauthorized access, destruction, disclosure, modification, etc., of an asset of the entity). Security threats and/or attacks can originate from and/or be performed by an attacker (e.g., a threat agent). A security threat can become a security attack when the attacker performs an action to implement the threat.

Detecting these security threats can be expensive, both in terms of computation and human effort and take a protracted period of time to complete. For example, security threat detection may involve mining and processing enormous amounts of data to discover discrepancies and/or anomalies that can be relevant to security. Security-relevant incidents may be difficult to discover because they may have a relatively small footprint. For example, the smaller the footprint of a security attack, the less likely the attack will be discovered, which can allow the attack to become more widespread. The security-relevant events may be discovered by using knowledge of patterns of events that may not be easily classified. To ease this detection burden, the security threat detection task may be distributed across multiple participants (e.g. security monitored participants) in an exchange of security threat information (e.g., a threat exchange community, etc.).

A potential barrier to organizations participating in a threat exchange community can be protecting confidential information and/or data. For example, participants in a threat exchange community might be unwilling to share information about their infrastructure, such as details about their network topology, software systems, and/or employee behaviors. One way to approach this is to provide each participant in the exchange a pseudonym corresponding to security data for that participant.

A threat exchange community can be a group of computing systems that exchange information related to information technology infrastructures (e.g., systems and services) via communications links. The computing systems can be referred to as participants of the threat exchange community. In some implementations, entities including or controlling the computing systems can also be referred to as participants of the threat exchange community.

As an example, a threat exchange community can include a participant server or group of participant servers within the information technology infrastructure of each entity from a group of entities. Each participant server (or each group of participant servers) provides information related to actions within or at the information technology infrastructure including that participant server to a threat exchange server. The threat exchange server analyses the information provided by each participant server to identify security occurrences within the threat exchange community, and provides alerts related to the security occurrences to participant servers.

In some implementations, participant servers communicate in a peer-to-peer architecture and the threat exchange server (or functionalities thereof) is distributed across the participant servers or a subset of the participant servers. That is, in some implementations a threat exchange community does not include a centralized threat exchange server. Rather, the threat exchange server is realized at a group of participant servers.

The information that a participant can share with a threat exchange community may include data related to security information of the entity (e.g., organizations, government entities, companies, etc.). The data from a participant can include a table of information. The table of information can include records. The records can include fields which can then be strings of records. The fields can represent internal IP addresses, host names, software identifiers, and/or patch levels within that participant's infrastructure. Security information can include threats on a participant's network (e.g., security threats).

A security threat can include an attempt to access unauthorized information. A security threat can also include an attempt to infiltrate a computer system or network with, for example, a computer virus, worm, etc. A threat exchange server can include a server containing security data and security events (e.g., authorized or unauthorized access attempts, attempts to introduce viruses, incorrect password attempts, data log information, etc.). A participant can be an entity that has joined a security exchange. The participant can join the exchange by sharing information that can include security events of the entity.

Sharing the detection task among many participants (e.g., organizations, government entities, companies, etc.) may not be easy due to data being locally meaningful and the difficulty of transporting large amounts of data to be processed. For example, a financial company may be able to cross-correlate traditional computer security event data with data related to financial fraud involving security attacks on online bank accounts, whereas a non-financial company may not be able to find useful meaning in the traditional computer security data. In another example, some networking related detection tasks are sent to Internet Service Providers (ISPs) because the ISPs have broader visibility and/or understanding of networking and routing issues. In addition, it may not be feasible to allocate the entire detection task to a remote node location. Furthermore, many entities may not be able to sustain constant high demand operational support for threat detection tasks due to high costs and/or a need for downtime for maintenance.

In contrast, according to the present disclosure, identifying specific participants to carry out particular detection tasks can help mitigate these issues. For example, a detection task can be distributed to only a subset of the participants exhibiting a suspicious pattern of security events. In another example, a detection task can be distributed to a particular participant with a particular expertise in discovering security threat patterns of security events.

Embodiments of the present disclosure can include multiple network devices, systems, including executable instructions and/or logic thereon, and methods for security threat analysis. A network device can include a processing resource and/or logic coupled to a memory. The memory can include program instructions executable by the processing resource to generate a security related task, send a request to at least one security monitored participant based on the security monitored participants ability to carry out the task, and receive a response related to the security related task from the at least one security monitored participant.

In addition, as will be appreciated, the proportion and the relative scale of the elements provided in the figures are intended to illustrate the examples of the present disclosure, and should not be taken in a limiting sense. As used herein, the designators "K", "L", "M", and "N", particularly with respect to reference numerals in the drawings, indicate that a number of the particular feature so designated can be included with a number of examples of the present disclosure. Also, as used herein, "a number of" an element and/or feature can refer to one or more of such elements and/or features.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a system for security threat analysis according to the present disclosure. A system can include a threat exchange server 102 that is networked via a communication link 104-K to one participant 106-K (e.g., $P_K$ designates participant K and so forth) of a plurality of participants 108 (e.g., a threat exchange community). Likewise, $P_L$ 106-L is networked via 104-L, $P_M$ 106-M is networked via 104-M, $P_N$ 106-N is networked via 104-N, and so forth. The communication links shown for $P_K$ to $P_N$ are not the only communication links that can exist in one embodiment. For the sake of clarity, some communication links to participants are omitted (e.g., no communication link to $P_1$ is shown although $P_1$ is linked to the threat exchange server 102).

Communication links, as used herein, can include network connections, such as logical and/or physical connections. In some examples of the present disclosure, the communication links (e.g., 104-K, . . . , 104-L, . . . , 104-M, . . . , 104-N) providing communication from the threat exchange server to the participants (e.g., 106-K, 106-L, 106-M, . . . , 106-N, respectively) may also be communication links providing communication from the participants to the threat exchange server 102. In some examples of the present disclosure, there can be two separate sets of communication links, one for communication from the threat exchange server 102 to a plurality of participants 108 and another for communication from the plurality of participants 108 to the threat exchange server 102.

The threat exchange server 102 can comprise a database 110 for storing security related information (e.g., security threats, security events, security logs, etc.). The database can compile security related information from one of the plurality of participants 108. For example, participants can send the threat exchange server 102 information related to their specific business and/or operations. The database 110 can compile security related information from external information sources that are not participating in a threat exchange community. For example, an entity that collects information both related to security and unrelated to security from multiple business sectors and multiple companies and corporations can share this information with the threat exchange server 102. The threat exchange server 102 can use this information in its analysis of the plurality of participants' 108 security data.

In some examples, the plurality of participants 108 can be grouped together based on one or more of a plurality of criteria. For instance, the plurality of participants 108 may be grouped based on similar organizational structure. For example, two or more participants each having a large organization with thousands of employees and a similar number of customers can be grouped together in a threat exchange community. Alternatively or in addition, a plurality of participants 108 can be grouped together based on similar fields of industry (e.g., financial, marketing, sales, etc.). For example, two or more participants whose business deals with the banking industry can be grouped together.

In FIG. 1, the database 110 of the threat exchange server 102 can process the security data received (e.g., via communication links 104-K, . . . , 104-L, . . . , 104-M, . . . , 104-N) from the plurality of participants 108. The processing of the security data can include identifying a set of participants 112 (e.g., $P_2$ 106-2, $P_3$ 106-3, . . . $P_K$ 106-K, $P_5$ 106-5, $P_6$ 106-6, . . . $P_L$ 106-L, $P_8$ 106-8, $P_9$ 106-9, . . . , and $P_M$ 106-M), grouped based on particular patterns in the set of participants' 112 security data. In some examples, the security data pattern can include particular security attacks on each of the set of participants 112. The security data pattern can include suspicious security events that may need further analysis to verify whether the suspicious security events are security attacks. The security data pattern can be a security data pattern common to the set of participants 112.

Security data collected from a plurality of participants 108 can be analyzed by a hypothesis module 114 in the threat exchange server 102. The hypothesis module 114 can, in some examples, be located external to the threat exchange server 102 and the information from the hypothesis module 114 can be transferred to the threat exchange server 102. Security data collected from a plurality of participants 108 can be analyzed by the hypothesis module 114 to determine a set of participants 112 from the plurality of participants 108 that exhibit similar security data patterns. The hypothesis module 114 can determine a pattern in security data from the set of participants 112. The hypothesis module 114 can determine a hypothesis related to the security data.

The hypothesis module 114 can determine an hypothesis based on the security data it receives. The hypothesis module 114 can determine an hypothesis from patterns in the security data. For example, if the hypothesis module 114 detects anomalies in security data that occur on a participant's network, the hypothesis module can determine an hypothesis that includes the possibility of a security attack. In addition, the hypothesis module 114 can detect patterns in the security data and form a hypothesis that indicates there is a possible security attack. The hypothesis can include that one participant is experiencing a security attack or that more than one participant is experiencing a security attack.

An hypothesis can include a determination that a security attack has occurred but may need further information to determine additional characteristics. For example, a security attack can be detected but the origin of the attack is unknown. In addition, a security attack can be detected but the intention of the attack is unknown. In addition, a security attack can be detected but the type of target experiencing the attack is unknown. When an hypothesis including detection of certain security anomalies occurs with certain unknown characteristics, determining these characteristics can involve further analysis of the security data. The further analysis of the security data can occur at the threat exchange server 102. The analysis of the security data can be performed by a plurality of participants 108 (e.g., 106-1, 106-2, 106-3, ..., 106-K, 106-L, 106-M, ..., 106-N) or by at least one of a plurality of participants 108. A request module 116 can determine which participants should receive a request to analyze security data.

A request can include a message from the threat exchange server 102 to a participant in a threat exchange community requesting that the participant perform a task (e.g., collect data, analyze data, verify a hypothesis, etc.). In one example, a request can include a message from a participant in a threat exchange community requesting that another participant perform a particular task for the participant. In one example, the request can go from the participant to the threat exchange server. The threat exchange server can then determine which participant (e.g., another participant) to send the request to and then the threat exchange server can send the request to the other participant. The request module 116 can send a request, via communication links (e.g., 104-K, ..., 104-L, ..., 104-M, ..., 104-N, etc.), to analyze the security data to a first set of participants 112 (e.g., 106-2, 106-3, ..., 106-K, 106-L, ..., 106-M). The request module 116 can send a request to analyze security data to a second set of participants 118 (e.g., 106-3, ..., 106-K, ..., 106-L).

The request module 116 can send a request to a participant that requests analysis of security data related to the participant receiving the request. For example, the request module 116 can send a request to $P_3$ 106-3 to analyze data the threat exchange server 102 received from $P_3$ 106-3. The request module 116 can send a request to a participant to analyze data received from a different participant. For example, a request module 116 can send a request to $P_3$ 106-3 to analyze data the threat exchange server 102 received from $P_3$ 106-2.

The request module 116 can send a request to verify an hypothesis to a participant of the plurality of participants 108 that is not in the first set of participants 112. For example, a request can be sent to a participant that does not exhibit an anomaly or particular patterns in the participant's security data. The participant not exhibiting anomalies or patterns may receive the request due to expertise, a particular service agreement, or one of a number of criteria.

The request module 116 can send a request based on expertise of the participant. For example, a second set of participants 118 can have a similar security risk identified as the first set of participants 112. The second set of participants 118 can receive a request from the request module 116 due to an expertise the second set of participants 118 have with a particular anomaly related to an hypothesis about security data risk. The request module 116 can send a request based on an agreement between the participant and the administrator of the threat exchange server. For example, a second set of participants 118 can have an agreement to analyze a particular type or portion of security data to verify an hypothesis or analyze security data during a particular time period, etc. The request module 116 can send a request based on an agreed upon amount of compensation for performing the requested task. For example, a particular participant can agree to be paid an amount to perform a task, the particular participant can be notified when that task can be performed, and the particular participant can be compensated when a response to the request is received by the threat exchange server from the particular participant.

In some examples, the request module 116 can send a portion of the security data to be analyzed in order to verify a portion of the hypothesis to a participant in a second set of participants 118. The request module 116 can send a portion of the security data to be analyzed in order to verify a portion of an hypothesis to a participant of a plurality of participants 108 that is not in a first set of participants 112. For example, a request can be sent to a participant that does not exhibit an anomaly and/or particular patterns in the participant's security data. The participant not exhibiting anomalies or patterns may receive the request due to expertise, a particular service agreement, or any one of a number of criteria.

A response from a participant of a plurality of participants 108 can be sent to a threat exchange server 102 to verify an hypothesis related to security data. For example, a threat exchange server can send a request to a participant to analyze data related to a malware virus (e.g., a task). The participant can analyze the data related to the malware virus and send the analysis and/or conclusions from the analysis to the threat exchange server (e.g., a response). A response can be sent to a verify module 120 for verification of the hypothesis. Several responses can be received from a number of the plurality of participants 108 in order to verify several pieces of the hypothesis and verify the overall hypothesis. The verified hypothesis can be stored in a threat exchange server 102. The verified hypothesis can be sent to at least one of the plurality of participants 108. The verified hypothesis can be sent to at least one of the first set of participants 112 and/or at least one of the second set of participants 118.

The verify module 120 can determine an accuracy (e.g., veracity, correctness, probability it can be relied on, etc.) of the hypothesis. For example, the hypothesis can be determined to be partially correct. The hypothesis can be determined to be totally correct. The hypothesis can be determined to be completely incorrect. The hypothesis can be determined to be partially incorrect.

Figure 2:
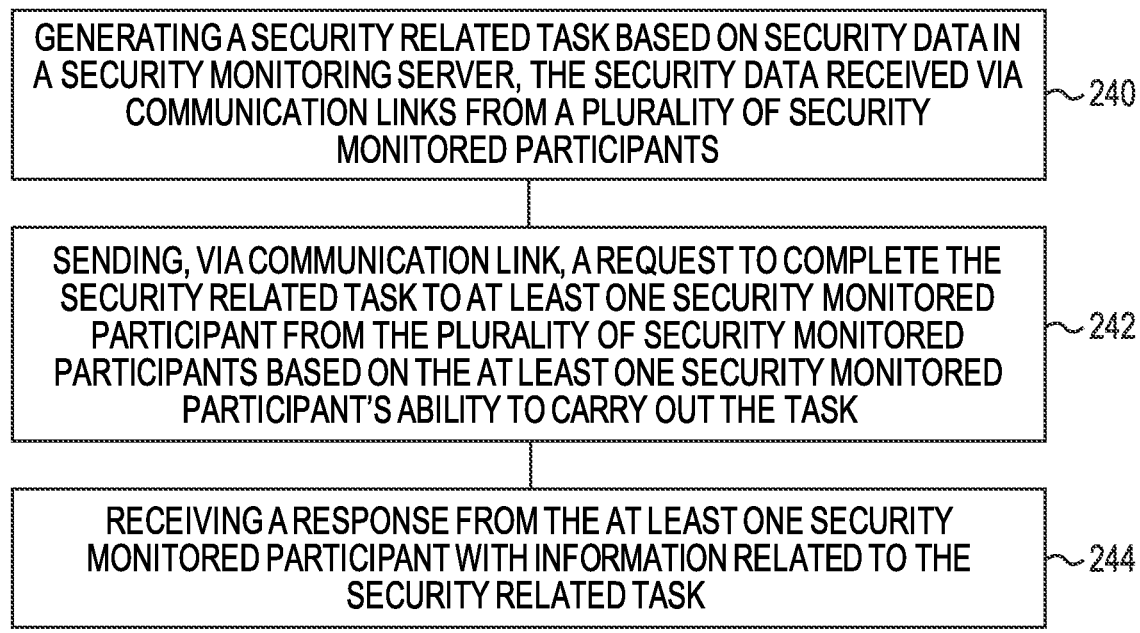
FIG. 2 illustrates an example of a method for security threat analysis according to the present disclosure.

FIG. 2 illustrates an example of a method of security threat analysis according to the present disclosure. As shown at block 240, generating a security related task can be based on security data, in a threat exchange server. The threat exchange server can generate a security related task based on stored security related information (e.g., detection rules, mitigation data, malware data, security threats, security events, security logs, etc.). The database can compile security related information from one of a plurality of participants (e.g., a threat exchange community). For example, a participant can send the threat exchange server (e.g., 102 in FIG. 1) information related to the participant's specific business and/or operations. The database can also compile security related information from external information sources that are not participating in the threat exchange community (e.g., a non-participant).

A number of tasks can be distributed to the plurality of participants (e.g., threat exchange community). The tasks can include developing resources related to mitigating attacks, detection rules, malware analysis, malware signatures, etc. For example, a participant can receive a request to complete a task including determining a way to mitigate a particular attack. In addition, for example, a participant can receive a request to determine detection rules based on security data to find particular malware. A task can also include a hypothesis generated by the threat exchange server that a security attack has been attempted and/or has occurred.

An hypothesis can be based on the security data it receives (e.g., an hypothesis can be generated from patterns in the security data). For example, if the threat exchange server detects anomalies in security data that occur on a participant's network, an hypothesis can indicate there is a possible security attack. An anomaly can include an unexpected security event. An anomaly can include a particular access attempt and/or attempts. An anomaly can include a security event harmful to the participant. For example, an anomaly can be a user attempting to access a database with an incorrect password. In addition, an anomaly can be a user attempting to access a database an unexpected number of times with a correct password in a particular time period. An anomaly can include data that can be predetermined to be an anomaly (e.g., this many attempts is an anomaly, this type of access attempt, etc.).

In addition, a generated hypothesis can include detection of patterns in the security data that indicate a security attack. The hypothesis can include that one participant is experiencing a security attack or that more than one participant is experiencing a security attack. In addition, an hypothesis can include that a particular type of business will have a particular type or frequency of security attacks. For example, an hypothesis can indicate that a financial company can experience a particular virus attack at a greater frequency than a non-financial company. The hypothesis can also include a particular time of day the attack occurs. Any number of characteristics can be included in an hypothesis.

In addition, an hypothesis can include a determination that a security attack has occurred but may need further information to determine additional characteristics. For example, a security attack can be detected but the origin of the attack is unknown. In addition, a security attack can be detected but the intention of the attack is unknown. In addition, a security attack can be detected but the type of target experiencing the attack is unknown. When an hypothesis includes detection of certain security anomalies that occur with certain characteristics being unknown, determining these characteristics can involve further analysis of the security data. For example, a security attack can be identified without a known target or known purpose of the security attack. Further analysis of the security data can be performed at at least one participant of a plurality of participants.

As shown at block 242, a request to complete the security related task can be sent, via communication links, to at least one security monitored participant based on the at least one security monitored participant's ability to carry out the task. A request can be sent, via communication links, to a first set of participants that are experiencing security data anomalies to analyze security data. In some examples, a request to analyze security data can include a request to verify a specific security data hypothesis. A request can be sent to analyze security data to a second set of participants that is a subset of the first set of participants. For example, three participants may be experiencing security data anomalies but only one participant analyzes the data for the benefit of the group. A request can be sent to a participant based on a calculation of which requests were answered by which participants. In this way, the group of participants can share the burden of analyzing data and maintain a spread of workload across a plurality of participants.

A request can be sent to a participant based, at least partially, on the participant's available resources. For example, a participant that is a retailer may have a slow time of year during a non-holiday period of the year. The participant's resource requirements are low and therefore the participant can analyze data without a negative impact on their business. The request to analyze security data can be sent to this participant rather than a different participant with different resource requirements during this time period. Resources can also include equipment, such as computers, programs, etc.

A request can be sent on behalf of another participant. For example, a first participant may want to have security data analyzed by another participant. A threat exchange server can anonymize the security data for the first participant and send a request to analyze the data to a second participant. In this way, the threat exchange server serves as a mediator to maintain anonymity while sharing resources for analysis. The response from the second participant can be sent through the threat exchange server to the first participant to answer the inquiry.

As shown at block 244, a response can be received from the at least one security monitored participant with information related to the security related task. A task can include a hypothesis that may be verified by the at least one security monitored participant. The response can include verifying an accuracy (e.g., a veracity, correctness, probability it can be relied on, etc.) of the security threat hypothesis. Several responses can be received from a number of the plurality of participants in order to verify several pieces of an hypothesis and to verify the overall hypothesis.

The hypothesis can be verified by receiving a response and further analyzing the response to determine the accuracy of an hypothesis. For example, an hypothesis can be determined to be partially correct based on a response from a participant that only analyzed a portion of the total security data that may be needed to verify the entire hypothesis.

Figure 3:
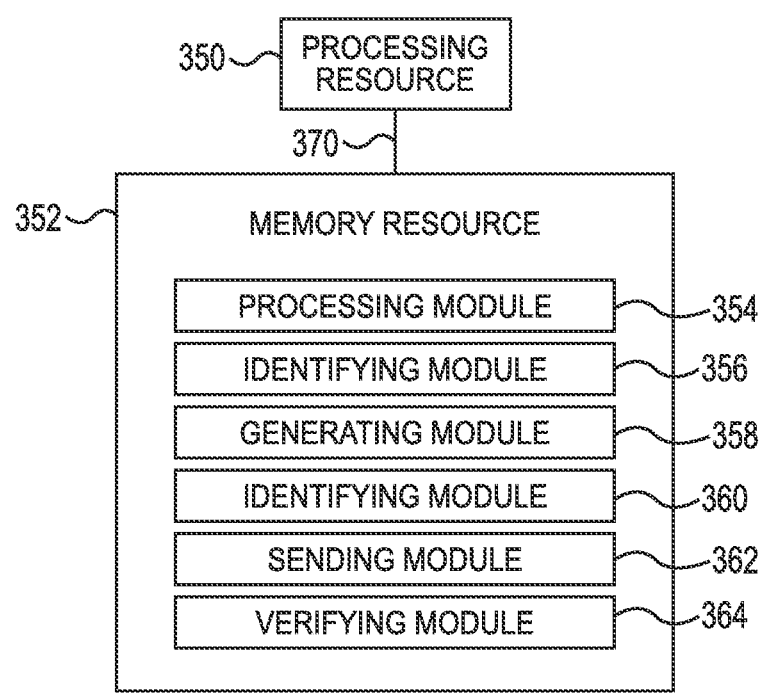
FIG. 3 illustrates an example of a processing resource and a memory resource for security threat analysis according to the present disclosure.

FIG. 3 illustrates a block diagram illustrating an example of a processing resource 350 and a memory resource 352 for security threat verification according to the present disclosure. The processing resource 350 and the memory resource 352 can be local to a computing network, such as on a router. The memory resource 352 (e.g., a tangible, non-transitory medium) can store a set of program instructions (e.g., software, firmware, etc.) executable by the processing resource 350. Memory resource 352 may be integrated in a single device or distributed across devices. The memory resource 352 may be fully or partially integrated in the same device as processing resource 350 or it may be separate but accessible to that device and processing resource 350 (e.g., via a communication path 370). The memory resource 352 can be local to a router or remote therefrom. For those examples in which the memory resource 352 is remote from the router, the instructions can be loaded into the memory resource of the router.

Memory resource 352 can be in communication with a number of processing resources of more or fewer than 350. The processing resources 350 can be in communication with a tangible non-transitory memory resource 352 storing a set of computer-readable instructions (CRI) executable by one or more of the processing resources 350, as described herein. The CRI can include a number of modules 354, 356, 358, 360, 362, and 364. The CRI can also be stored in remote memory managed by a threat exchange server and represent an installation package that can be downloaded, installed, and executed.

Processing resources 350 can execute CRI that can be stored on an internal or external non-transitory memory resource 352. The processing resources 350 can execute CRI to perform various functions, including the functions described in FIG. 1 and FIG. 2. For example, the processing resources 350 can execute CRI to implement a security threat verification from FIG. 1.

The number of modules 354, 356, 358, 360, 362, and 364 can include CRI that, when executed by the processing resources 350, can perform a number of functions. The number of modules 354, 356, 358, 360, 362, and 364 can be sub-modules of other modules. For example, a processing module 354 and an identifying module 356 can be sub-modules and/or contained within the processing module 354 in FIG. 3. In another example, the number of modules 354, 356, 358, 360, 362, and 364 can comprise individual modules on separate and distinct computing devices.

A processing module 354 can include CRI that when executed by the processing resources 350 can process security data at a threat exchange server (e.g., 102 in FIG. 1). Processing of security data can include analyzing security data received from a security monitored participant. Processing of security data can include analyzing security data based on an external security data source. Processing of security data can include comparing security data of an external source to security data of a security monitored participant.

An identifying module 356 can include CRI that when executed by the processing resource 350 can identify a pattern in security data that indicates a security threat. A pattern in security data can include a frequency of a security event. A pattern in security data can include repetitious behavior such as certain security events at a particular time period. A pattern in security data can include a type of security event on a type of participant. A pattern can include a partial pattern that requires further analysis to determine if it is an actual pattern.

A generating module 358 can include CRI that when executed by the processing resource 350 can generate a security threat hypothesis at a threat exchange server based on a pattern in security data. A security threat hypothesis can include a determination that a security threat is occurring. A security threat hypothesis can include that a security threat has a probability of occurring based on the analysis and may need further analysis. A security threat hypothesis can include a determination that security events appear common (e.g., between a number of participants).

An identifying module 360 can include CRI that when executed by the processing resource 350 can identify a first set of security monitored participants from a plurality of security monitored participants that include a pattern in their respective security data. The first set of security monitored participants can include participants experiencing a similar security attack. The first set of security monitored participants can include participants that have been attacked and additional analysis to determine the cause can be requested.

A sending module 362 can include CRI that when executed by the processing resource 350 can send a request, via communication links, based on the security data for analysis to verify the security threat hypothesis to a second set of security monitored participants. A request can be sent to verify that security data is normal. A request can be sent to gain additional information to form an hypothesis where it may have been difficult to determine if there was or was not a security threat. A request can be sent to participants that are experiencing a security threat issue. A request can be sent to a participant that is not experiencing a security issue but that may have particular skills or expertise to analyze security data.

A verifying module 364 can include CRI that when executed by the processing resource 350 can verify an accuracy (e.g., veracity, correctness, probability it can be relied on, etc.) of a security threat hypothesis based on a response from at least one security monitored participant. Verifying the security threat hypothesis can determine that an hypothesis that is incorrect. Verifying the security threat hypothesis can determine an hypothesis that is correct. Verifying the security threat hypothesis can determine uncertainty about the hypothesis and appropriateness of request for additional information to verify the accuracy.

A non-transitory memory resource 352, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, as well as other types of computer-readable media.

The non-transitory memory resource 352 can be integral, or communicatively coupled, to a computing device, in a wired and/or a wireless manner. For example, the non-transitory memory resource 352 can be an internal memory, a portable memory, a portable disk, or a memory associated with another computing resource (e.g., enabling CRIs to be transferred and/or executed across a network).

The memory resource 352 can be in communication with the processing resources 350 via the communication path 370. The communication path 370 can be local or remote to a machine (e.g., a computer) associated with the processing resources 350. Examples of a local communication path 370 can include an electronic bus internal to a machine (e.g., a computer) where the memory resource 352 is one of volatile, non-volatile, fixed, and/or removable storage medium in communication with the processing resources 350 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 370 can be such that the memory resource 352 is remote from the processing resources e.g., 350, such as in a network connection between the memory resource 352 and the processing resources (e.g., 350). That is, the communication path 370 can be a network connection. Examples of such a network connection can include a local area network (LAN), wide area network (WAN), personal area network (PAN), and the Internet, among others. In such examples, the memory resource 352 can be associated with a first computing device and the processing resources 350 can be associated with a second computing device (e.g., a Java® server). For example, a processing resource 350 can be in communication with a memory resource 352, wherein the memory resource 352 includes a set of instructions and wherein the processing resource 350 is designed to carry out the set of instructions.

The processing resources 350 coupled to the memory resources 352 can execute CRI to process security data at a threat exchange server. The processing resources 350 coupled to the memory resources 352 can also execute CRI to identify a pattern in the security data that indicates a security threat. The processing resources 350 coupled to the memory resources 352 can also execute CRI to generate a security threat hypothesis at a threat exchange server based on the pattern in security data. The processing resources 350 coupled to the memory resources 352 can also execute CRI to identify a first set of a plurality of security monitored participants, where each of the first set has evidence of the security threat in their respective security data based on the pattern. The processing resources 350 coupled to the memory resources 352 can also execute CRI to send to a second set of security monitored participants a request, via communication links, based on the pattern for analysis to verify a security threat hypothesis. The processing resources 350 coupled to the memory resources 352 can also execute CRI to verify an accuracy of a security threat hypothesis based on a response from at least one security monitored participant.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for security threat analysis, comprising:
utilizing a processor to execute instructions stored on a non-transitory medium for:
   generating, via the processor, a security related task based on security data in a security monitoring server, wherein the security related task includes an analysis of data and the security data is received via communications links from a plurality of security monitored participants;
   sending, via a communication link, to at least one of the plurality of security monitored participants:
      a request to complete the security related task based on the at least one security monitored participant's ability to carry out the task, and
      a set of the security data, wherein the set of security data is from at least two of the plurality of security monitored participants;
   sending, via the communication link, the request to a subset of the plurality of security monitored participants, the subset having a similar pattern in their corresponding security data; and
   receiving, via the processor, a response from the at least one security monitored participant with information related to the security related task.

2. The method of claim 1, comprising generating the security related task at least partially from security data received from the at least one security monitored participant.

3. The method of claim 1, wherein receiving a response comprises receiving a response from at least one security monitored participant from the subset of security monitored participants.

4. The method of claim 1, comprising determining a compensation amount for a response to a requested task from the at least one security monitored participant.

5. A system for security threat analysis comprising:
a processor; and
a data storage device communicatively coupled to the processor, the data storage device containing instructions executable by the processor to:
   process security data at a server;
   generate, via the processor, a security threat hypothesis at the server;
   identify, via the processor, a first set of security monitored participants from a plurality of security monitored participants that exhibit similar patterns in their respective security data;
   send, via communication links, to a second set of security monitored participants having a similar pattern in their corresponding security data:
      a request based on the processed security data for an analysis to verify the security threat hypothesis; and
      a set of the processed security data, wherein the set of processed security data is associated with at least one of the first set of security monitored participants; and
   verify, via the processor, an accuracy of the security threat hypothesis based on a response from at least one of the second set of security monitored participants.

6. The system of claim 5, wherein the instructions are executable to determine which security monitored participants have existing resource requirements.

7. The system of claim 6, wherein the instructions are executable to send the request for the analysis of security data to the security monitored participants with the existing resource requirements.

8. The system of claim 5, wherein the instructions are executable to send security threat information related to the accuracy of the security threat hypothesis to the plurality of security monitored participants and to store the security threat information in the server.

9. The system of claim 5, wherein the security data is received from at least one of the plurality of security monitored participants.

10. A non-transitory computer-readable medium storing program instructions executable by a processing resource to:
   process security data associated with a plurality of security monitored participants at a server;
   identify a pattern in the security data that indicates a security threat;
   generate a security threat hypothesis at the server based on the pattern in the security data;
   identify a first set of security monitored participants from the plurality of security monitored participants, wherein the first set has evidence of the security threat in their respective security data based on the pattern;
   send, via communication links, to a second set of security monitored participants having a similar pattern in their corresponding security data:
      a request based on the pattern for analysis to verify the security threat hypothesis; and
      a set of the processed security data, wherein the set of processed security data is associated with at least two of the plurality of security monitored participants; and
   verify an accuracy of the security threat hypothesis based on a response from at least one security monitored participant.

11. The medium of claim 10, wherein the program instructions are further executable by a processor to receive the security data from the plurality of security monitored participants.

12. The medium of claim 10, comprising receive the security data from at least one non-participant external source.

13. The medium of claim 10, wherein the second set of security monitored participants comprises security monitored participants determined to have resources sufficient to analyze the security data.

14. The medium of claim 10, wherein the second set of security monitored participants comprises at least one of the plurality of security monitored participants determined based on at least one of an expertise and a sector of the at least one of the plurality of security monitored participants.

15. The method of claim 1, comprising identifying a pattern in the security data that indicates a security threat.

16. The method of claim 1, comprising determining which security monitored participants have existing resource requirements.

17. The method of claim 16, comprising sending the request to complete the security related task to the security monitored participants with the existing resource requirements.

18. The system of claim 5, wherein the instructions are executable to receive the security data from the plurality of security monitored participants.

19. The system of claim 5, wherein the instructions are executable to receive the security data from at least one non-participant external source.

20. The medium of claim 10, wherein the program instructions are further executable by a processor to determine which security monitored participants have existing resource requirements.

21. The medium of claim 20, wherein the program instructions are further executable by a processor to send the request to complete the security related task to the security monitored participants with the existing resource requirements.

* * * * *